US007987187B2

(12) United States Patent
Hetzer et al.

(10) Patent No.: US 7,987,187 B2
(45) Date of Patent: Jul. 26, 2011

(54) QUANTITY OFFSETTING SERVICE

(75) Inventors: Stephan Hetzer, Angelbachtal (DE);
Charlotte Hullo, Heidelberg (DE);
Jochen Hirth, Birkenau (DE);
Hans-Ulrich von Helmolt, Heidelberg (DE)

(73) Assignee: SAP Aktiengesellschaft, Walldorf (DE)

( * ) Notice: Subject to any disclaimer, the term of this patent is extended or adjusted under 35 U.S.C. 154(b) by 1784 days.

(21) Appl. No.: 11/023,887

(22) Filed: Dec. 27, 2004

(65) Prior Publication Data

US 2006/0156293 A1 Jul. 13, 2006

(51) Int. Cl.
*G06G 17/30* (2006.01)

(52) U.S. Cl. ........................................ 707/736; 707/770

(58) Field of Classification Search .................. None
See application file for complete search history.

(56) References Cited

U.S. PATENT DOCUMENTS

| 5,819,273 | A  | * | 10/1998 | Vora et al. ........................ 707/10 |
| 5,913,214 | A  | * | 6/1999 | Madnick et al. ................. 707/10 |
| 6,092,091 | A  | * | 7/2000 | Sumita et al. ................. 715/209 |
| 6,167,395 | A  | * | 12/2000 | Beck et al. ........................ 707/3 |
| 6,256,631 | B1 | * | 7/2001 | Malcolm ........................ 707/10 |
| 6,424,980 | B1 | * | 7/2002 | Iizuka et al. .................. 715/206 |
| 7,472,113 | B1 | * | 12/2008 | Watson et al. .................... 707/3 |
| 7,617,184 | B2 | * | 11/2009 | Ferrari et al. ..................... 707/3 |
| 2002/0049704 | A1 | * | 4/2002 | Vanderveldt et al. ............. 707/1 |
| 2002/0188499 | A1 | * | 12/2002 | Jenkins et al. .................. 705/10 |
| 2004/0024812 | A1 | * | 2/2004 | Park et al. ..................... 709/203 |
| 2004/0199578 | A1 | * | 10/2004 | Kapczynski et al. ......... 709/203 |
| 2005/0132284 | A1 | * | 6/2005 | Lloyd et al. ................... 715/517 |

* cited by examiner

*Primary Examiner* — Cam Truong (74) *Attorney, Agent, or Firm* — Blakely Sokoloff Taylor & Zafman LLP (57) ABSTRACT

Embodiments include a system for providing a set of services that retrieve requested data and calculate a requested value. The data retrieval service may traverse a set of related data structures such as data in a document or in a database to accumulate and return requested data. The data calculation service may determine an appropriate algorithm based on the data being processed and return a value. The data calculation service may call the data retrieval service to obtain the necessary data. These services may be independent services separate from other software applications. These services provide standard data determination and calculation functions across multiple applications and are accessible in a common software layer.

6 Claims, 6 Drawing Sheets

QUANTITY OFFSETTING SERVICE

BACKGROUND

1. Field of the Invention

The embodiments of the invention relate to consistent value determination. Specifically, the embodiments of the invention relate to a set of independent services to consistently determine a value for multiple applications.

2. Background

Businesses and other enterprises that manage large amounts of data utilize software to facilitate the storage and manipulation of the data. This data is utilized in multiple business processes. Data is utilized and contexturalized differently in each business processes.

Specialized software applications are created to manage data for each type of business process. A business must utilize separate software applications to handle each different business process. For example, a business utilizes one software application for handling the sales process and a separate application to handle the procurement process. Each of these separate software applications handles and formats related data in a manner specific to that application. Each application stores the data in a different format utilizing different quantity units and similarly specializes the data for use with that business process.

Sharing data between the separate software applications requires the conversion of data from one format to another. Different formats, units of measurements, data types and documents type for each application results in incorrect conversions and combinations of data when sharing data. These conversion errors introduce inaccuracies into both software applications. Each software application has its own method of handling the conversion or sharing of related data including separate conversion, functions or processes necessary to convert each data type or document type to a format or unit utilized by the software application.

SUMMARY

Embodiments include a system for providing a set of services that retrieve requested data and calculate requested values. The data retrieval service may traverse a set of related data structures such as data in a document or in a database to accumulate and return requested data. The data calculation service may determine an appropriate algorithm based on the data being processed and return a value. The data calculation service may call the data retrieval service to obtain the necessary data. These services may be independent services separate from other software applications. These services provide standard data determination and calculation functions across multiple applications and are accessible in a common software layer.

BRIEF DESCRIPTION OF THE DRAWINGS

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

Figure 1:
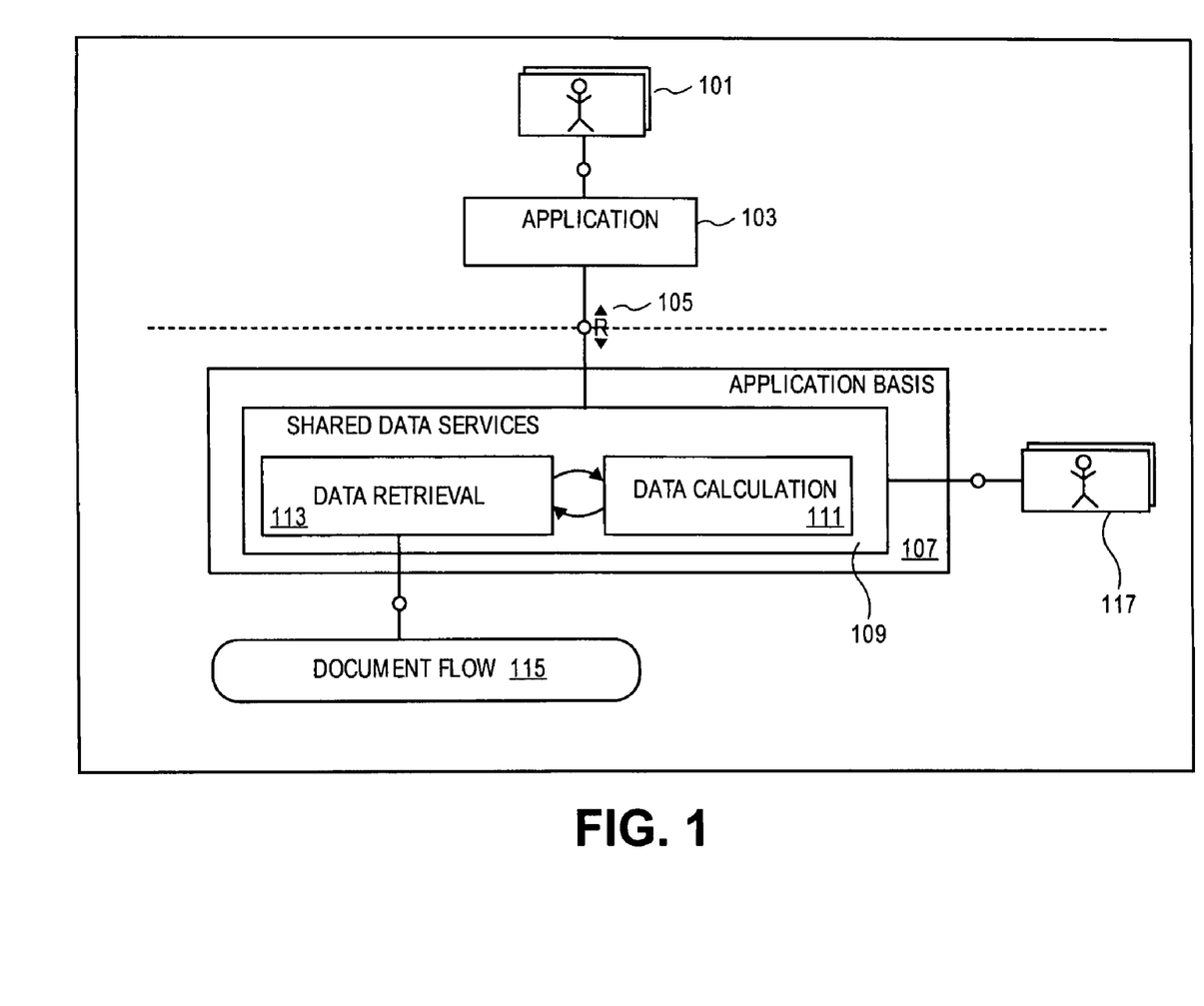
FIG. 1 is a diagram of one embodiment of the shared data calculation and retrieval services.

FIG. 1 is a fundamental modeling concepts (FMC) diagram of one embodiment of a system providing shared data calculation and retrieval services. In one embodiment, the system includes a user 101 or set of users either directly or indirectly utilizing application 103. Application 103 may be an application that may share or utilize data that is stored in a document flow or database or similarly shared with other applications. The application may be any type of application that shares data with other applications. In one embodiment, the application may be a supply chain management (SCM) application, enterprise resource planning (ERP) application, or similar application. In one embodiment, the application 103 may be in communication within an application basis, or similar program or set of utilities. The application may be in a separate software layer but sends and receives requests 105 remotely to and from the application basis 107.

In one embodiment, the application basis 107 may be provided by a server or set of servers in communication with the machine executing the application 103. An application basis 107 may be a set of utilities and programs for managing the execution of application 103 or a set of related applications. In one embodiment, the application basis 107 may include a set of shared services, libraries, utilities and similar programs and data. In one embodiment, the application basis 107 may be part of an ERP or SCM system or similar environment.

In one embodiment, the application basis 107 may include shared data retrieval and calculation services module 109. The application basis 107 may include shared data services module 109 and may be in communication or accessible to application 103 through an intermediate node. In one embodiment, the shared data services 109 may include a data retrieval service 113 and a data calculation service 111. Each of these services may be separately accessed or utilized by an application 103. These services may also communicate between themselves to exchange data. The shared data services 109 may be utilized by application 103 to retrieve needed data in a format that is appropriate for application 103. Multiple applications may utilize the shared data services 109 each requesting the same or related information and each receiving a consistent response value appropriate for the requesting application.

In on embodiment, the shared data services 109 may be in communication with a document flow 115, database or similar data storage system. The document flow 115 may be a set of related documents or data that may be utilized by an application 103 or set of applications. For example, a document flow may be a set of related electronic documents including purchase orders, sales orders, cancellation orders and similar documents used in an SCM context. Similarly, the database and other data storage may contain data utilized by application 103. A document flow or database may be stored on a separate machine or server from the application basis 107 or on a set of machines or servers.

In one embodiment, a user 117 may directly interact with the shared data services 109. A user may be an administrator privileged user or non-privileged user. The user 117 may send requests or calls to the shared data services 109 through an interface provided by the application basis 107 or the shared data services 109. The user 117 may also adjust the settings of the shared data services 109.

Figure 2:
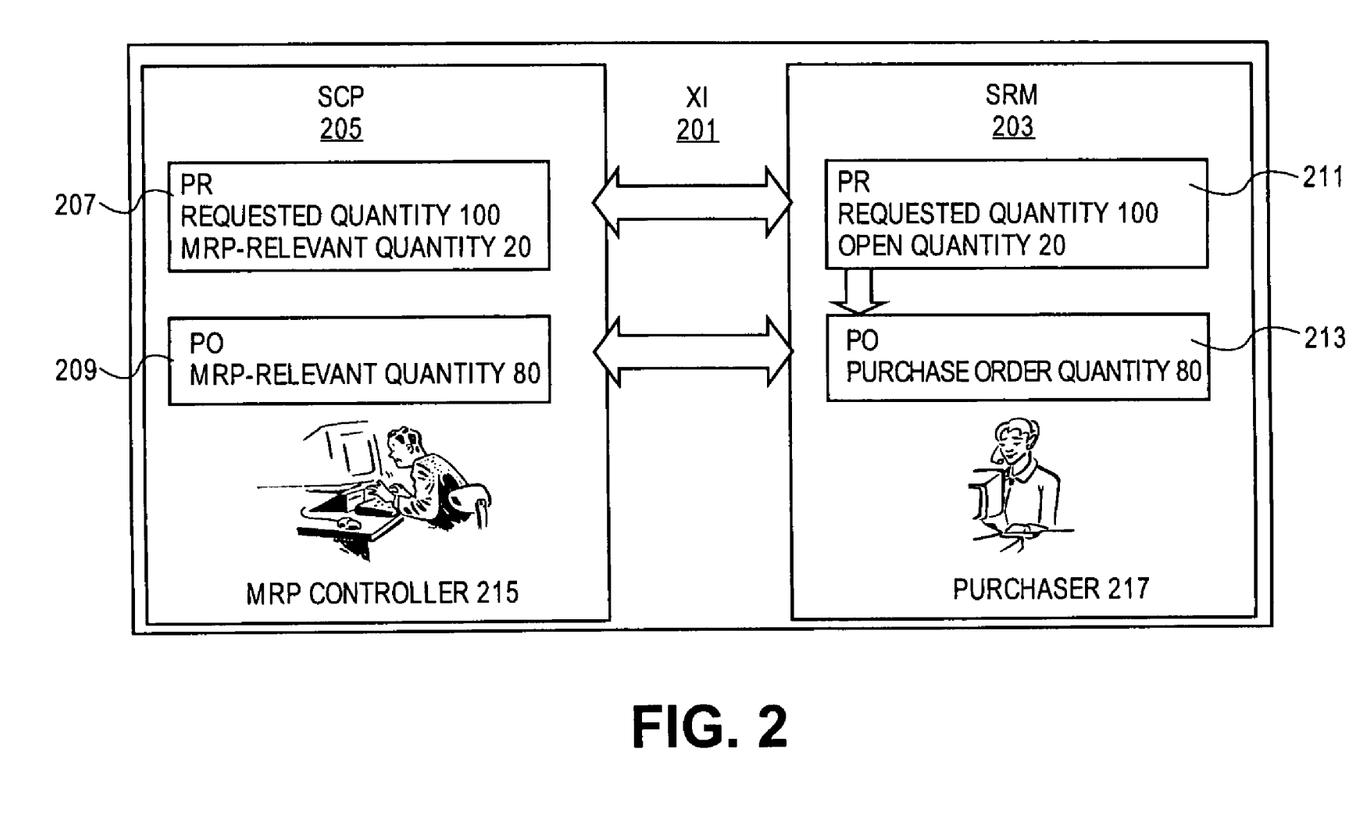
FIG. 2 is a diagram of one embodiment of a set of business applications that utilize the stored data calculation and retrieval services.

FIG. 2 is a diagram of an example system for utilizing a shared data service. In the example embodiment, a supply chain planning (SCP) application 205 is in communication with a supply relationship management (SRM) application 203 via an exchange infrastructure (XI) 201. The SCP application 205 may be utilized by materials requirements planning (MRP) controller 215 or similar individual. In one embodiment, the SRM 203 application may be utilized by a purchaser 217 or similar user. An SCP 205 may be an application or set applications to manage inventories and shipping in a supply chain for a company or set of companies. An SRM 203 may be an application or set of applications that are used by a company or set of companies to generate and manage purchase orders and requisition and similar documents and data.

In one embodiment, the purchaser 217 may create in the SRM a purchase requisition (PR) document 211. For example, this document may indicate that a request for 100 units of an item has been received and that 20 units of that request is not available to fulfill the request, i.e., the 'open quantity' of 20. The SRM 203 may convert the purchase request 211 into a purchase order (PO) document 213. Purchase order document 213 indicates that an item has been purchased in a quantity of 80 units. These documents (PR, PO) are shared through the exchange infrastructure 201 with the SCP application 205 and the MRP controller 215. The MRP controller 215 has access to related PR document 207 and PO document 209. The purchase request 207 in the SCP 205 shows the MRP controller 215 that a request quantity of 100 units has been received and also indicates an MRP relevant quantity of 20. This MRP-relevant quantity corresponds to the open quantity of document 211 and indicates to the MRP controller 215 that these additional 20 units must be procured. Similarly, purchase order document 209 in SCP 205 indicates that 80 units of the item are relevant to the MRP controller 215 because the order must be fulfilled. The SCP 205 and SRM 203 utilize the shared data services available to both, the SCP 205 and SRM 203 through an application basis common to both or similar common software layer. These shared data services guarantee the retrieval of accurate and consistent values for related documents such as the purchase request document 207 and purchase request document 211 and purchase order documents 209 and 213.

Figure 3:
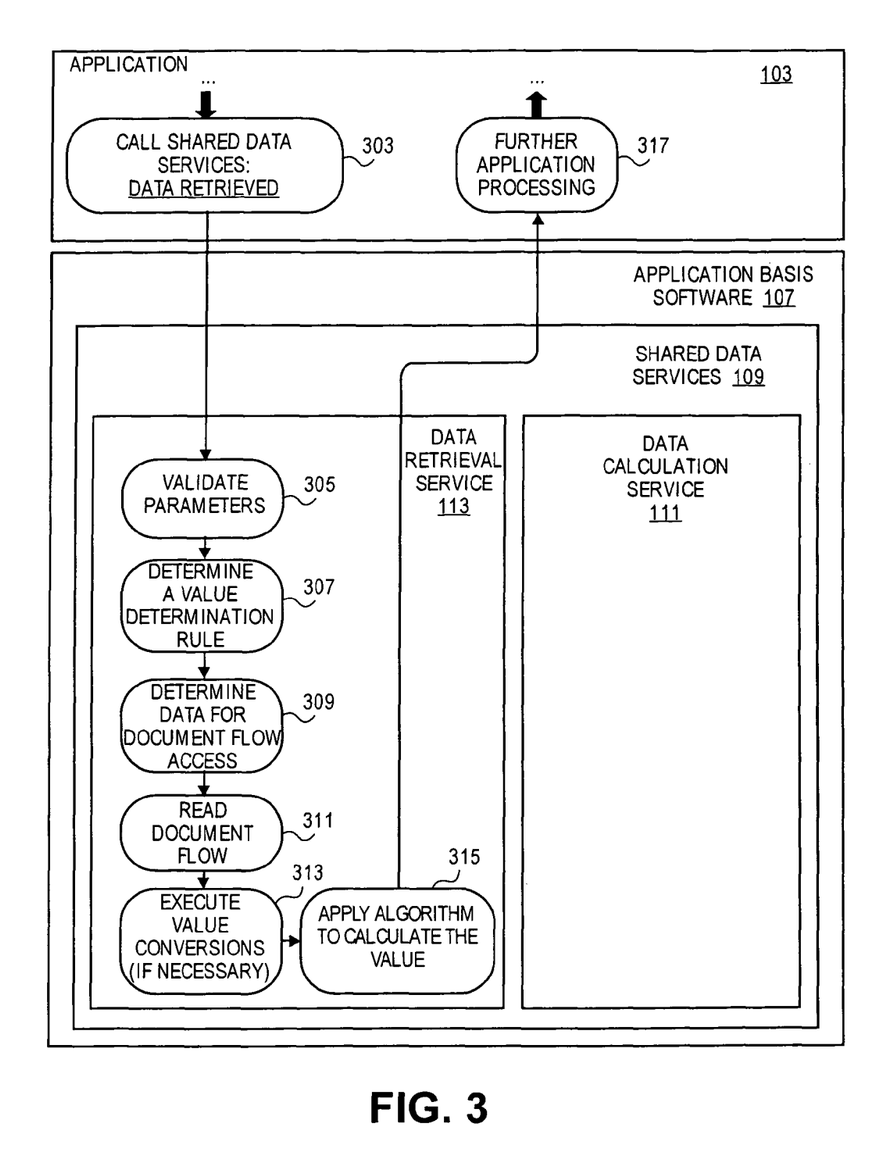
FIG. 3 is a diagram of one embodiment of the shared data retrieval service.

FIG. 3 is a diagram of one embodiment of the function of a data retrieval service. In one embodiment, a user or an application 103 such as an SRM application, an SCP application or similar application may call the shared data services, specifically the data retrieval service (block 303). In one embodiment, the application or user may request data from a data source or set of data sources such as a document flow or database. The user or application may request the data from the same data sources under different circumstances, use cases or similar scenarios. For example, an application may request a value or set of values for data calculation, tolerance checks, completion checks or similar circumstances.

In one embodiment, the call to the data retrieval service 113 may include an indication of a specific value to be retrieved or a document from which to retrieve the value. In one embodiment; the call from the application supplies a set of parameters to identify the desired value and data sources to be utilized to retrieve the desired value. Parameters may include data source identifiers, contextual use information about a desired value or data source, relation type and data source types or categories and similar information. In one embodiment, the data retrieval service 103 may receive a single call or request for a value at a time. In another embodiment, the data retrieval service may receive multiple calls or requests to be processed simultaneously, in parallel, or sequentially. The multiple requests may be provided in the form of a table or similar data structure. For sake of convenience, the discussion relates to the processing of a single call, but this may be extrapolated to be applied to multiple calls or requests. After the data retrieval service 113 receives the call and its accompanying parameters, the data retrieval service 113 may validate the received parameters (block 305). Data retrieval service 113 may check to determine if the received parameters fall within acceptable ranges and whether the parameters refer to existing or available files. If these parameters are not valid, an error message or similar indicator may be returned to the calling application 103.

In one embodiment, the data retrieval service 113 may analyze the received parameters to determine a value determination rule (block 307). A value determination rule may determine or define the methodology for retrieving data from a data source as well as relationships between the different data to be retrieved. For example, a value determination rule associated with a request for a value in a sales order document having multiple item lines may be an algorithm that generates a total number of a product sold by accumulating the numbers sold of that product in each item line of the sales document. The value determination rule may be used to determine the data to be retrieved from a data source such as a document flow or database (block 309). This may include indicating a manner in which documents are traversed or accessed from the document flow or database. These documents and similar data sources are then read to retrieve the relevant data from each identified document (block 311).

In one embodiment, the value determination rule may be selected based on an applicable system profile, customized profile, data source category, use context and similar information. In one embodiment, the shared data services may be utilized and designed in relation to an object relationship model. The model may be shared between the shared services and a business or similar process embodied in applications utilizing the shared services. The object relationship model may define a document or other data source types or categories and relationship types or categories between data sources or data in the data sources. Similarly, the definition of values may be hierarchically defined for use with the shared data services. Values may have 'roles' that define semantics of the values. For example, a value may represent a loading quantity in an SCM context. Values may be grouped into categories or types such as fulfilled or 'reduced' quantities and unfulfilled or 'open' quantities. Roles and categories may be stored in standard system profiles or customized profiles. A system profile may be standard to the shared data services. A customized profile may be a modified or additional set of roles and categories that may be modified or created by a user or administration. In one embodiment, the value determination rule may define which algorithm is to be applied to retrieve data, the location, type, category and similar properties of data to be retrieved and similar information.

In one embodiment, the data retrieved from separate documents or data sources such as a document flow or database may have values in different units or formats. In one embodiment, the data retrieval service 113 converts the values to a standard unit or format (block 313). In one embodiment, after the retrieved data has been standardized to a particular unit or format, an algorithm may be applied to a set of retrieved constituent data to determine the final value requested by the application 103 (block 315). The selection of an algorithm to be applied may be tied to the value determination rule, the type of format of the value to be returned or the document type from which the value is retrieved. The algorithm may be an accumulation, tallying or similar algorithm. In one embodiment, a user may define the algorithm to be applied. The algorithm may have any level of complexity. In one embodiment, the retrieved final value generated by the algorithm may then be returned to the requesting application (block 317). In another embodiment, if multiple requests were made of the data retrieval service, the requests may be returned at the same time. In one embodiment, the values may be returned in a table or similar data structure.

Figure 4:
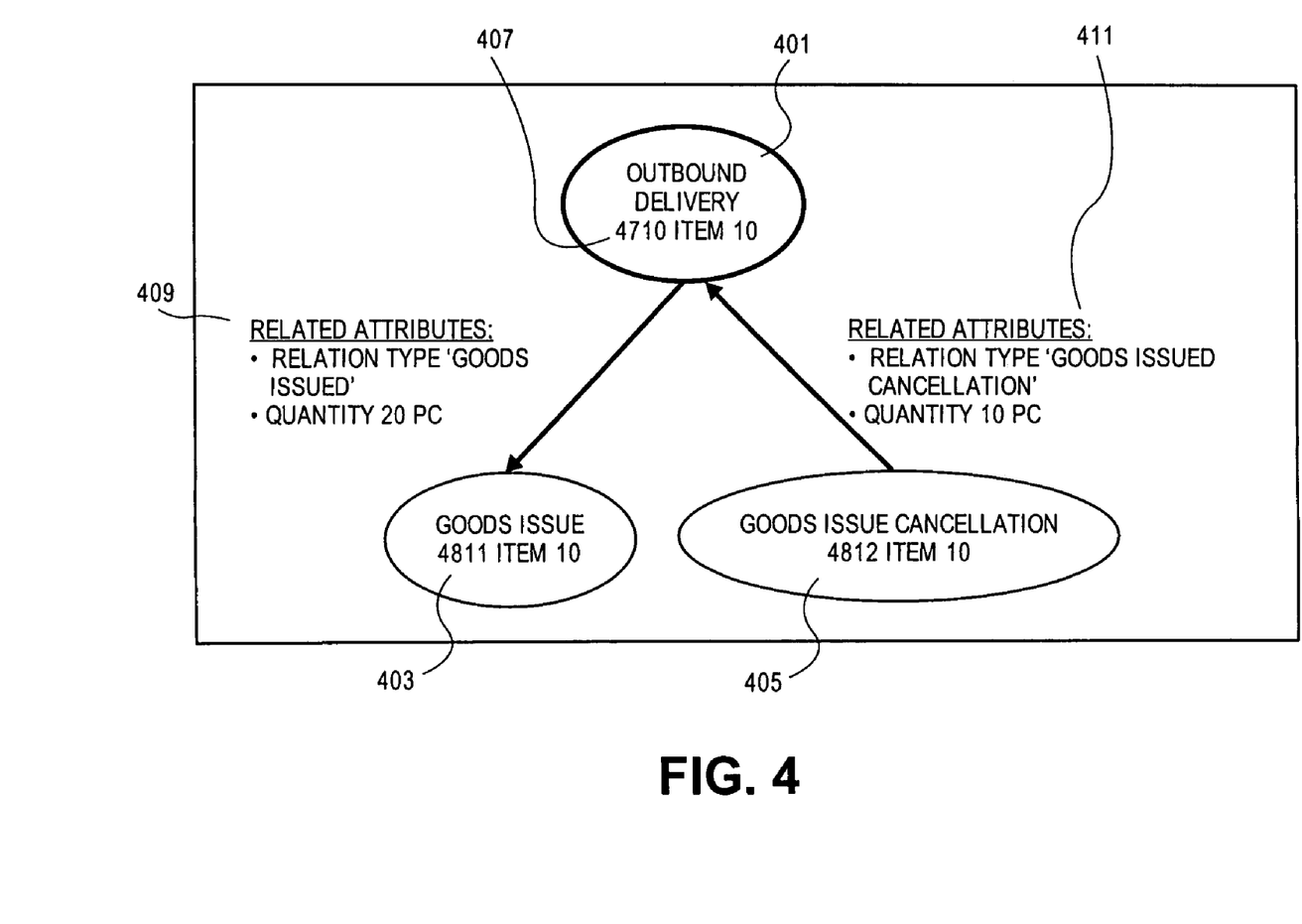
FIG. 4 is a diagram of one embodiment of a document flow.

FIG. 4 is a diagram of one example embodiment of a set of documents containing data requested by an application. The application requesting a value may send an indication of a primary document 401 or an aspect of a document. An aspect of a document may be an item line, schedule line or similar subcomponent of the document. In one embodiment, the document 401 may be identified by document I.D. number 407, keys related to the document or similar identifier. In another embodiment, a document I.D. 407 may indicate a part of the document corresponding to a subcomponent of the overall document 401.

For example, an outbound delivery document 401 may include a listing of multiple items to be shipped, including an item number 10. A primary document such as an outbound delivery item 401 may be related to other documents such as documents 403 and 405. These documents may have a connection with the primary document by a relationship illustrated by the directed lines and specified attributes 409 and 411. For example, a relation attribute 409 identifies the type of relationship as one related to 'goods issued' and having a related quantity of 20 pieces. Thus, in the example, item 10 and primary delivery document 401 may relate to another document 403 having a relationship to the primary document 401 identifying that the number of goods that have issued are 20 in number.

In one embodiment, a relationship between documents may be the result of an activity that leads from one document to another. For example, a sales order document may be related to a cancellation order by the act of canceling a shipment of the sales order. In one embodiment, the relationships between documents may be based on an object or document relationship model that is shared between the shared data services and application utilizing the shared data services.

In one embodiment, documents may include document category information and identifying aspects such as header keys, item keys, system keys, logic keys and similar identifiers. A relation may be a discrete data structure or set of data that includes a type or category, a value and unit of measurement and similar information. In one embodiment, a document or relationship may have an exclusion flag or similar indicator that designates that relationship to be excluded from shared data service use. A user or application may be able to set this flag. For example, one document related to a relationship may no longer be available and thus the relationship may be designated to be excluded. In another embodiment, other formats and organization of data may be utilized that allow the data retrieval service to locate and traverse the data to find relevant data.

In the example, document 405 may be related to primary document 401 by referencing that document where the reference has a relation attribute 411. In the example, this relationship attribute identifies a relation type as 'goods issued cancellation' and has an associated quantity of 20 pieces. In the example, the semantics of this set of documents indicate that an outbound delivery has been ordered for item number 10 as documented in document 401 and resulted in the issuance of 20 items of item number 10 as documented in document 403. A cancellation of a part of the delivery for 10 pieces is evidenced by document 405.

In one embodiment, according to this example, a data retrieval service receives an indication of outbound delivery document 407 and requests a current 'goods issued' value. The data retrieval service determines that the value to be retrieved is associated with a data retrieval rule that associates the quantities of the goods issued and cancelled to determine the requested value. The value retrieval rule may indicate that documents 403 and 405 are related to this calculation and the quantities in each of the relationships with these documents, namely the 20 pieces of goods issued and the 10 pieces of goods that were cancelled are retrieved. The algorithm for calculating the desired value is also determined based on the document type, requested value or data retrieval rule. For example, the following algorithm may be associated with the set of documents and values in the illustrated example: $\Sigma\{\text{requested value}\}=\{\text{'Goods Issued' 20 PC, 'Goods Cancelled'}-10\text{ PC}\}=10\text{ PC}$. This value may then be returned to the requesting application.

Figure 5:
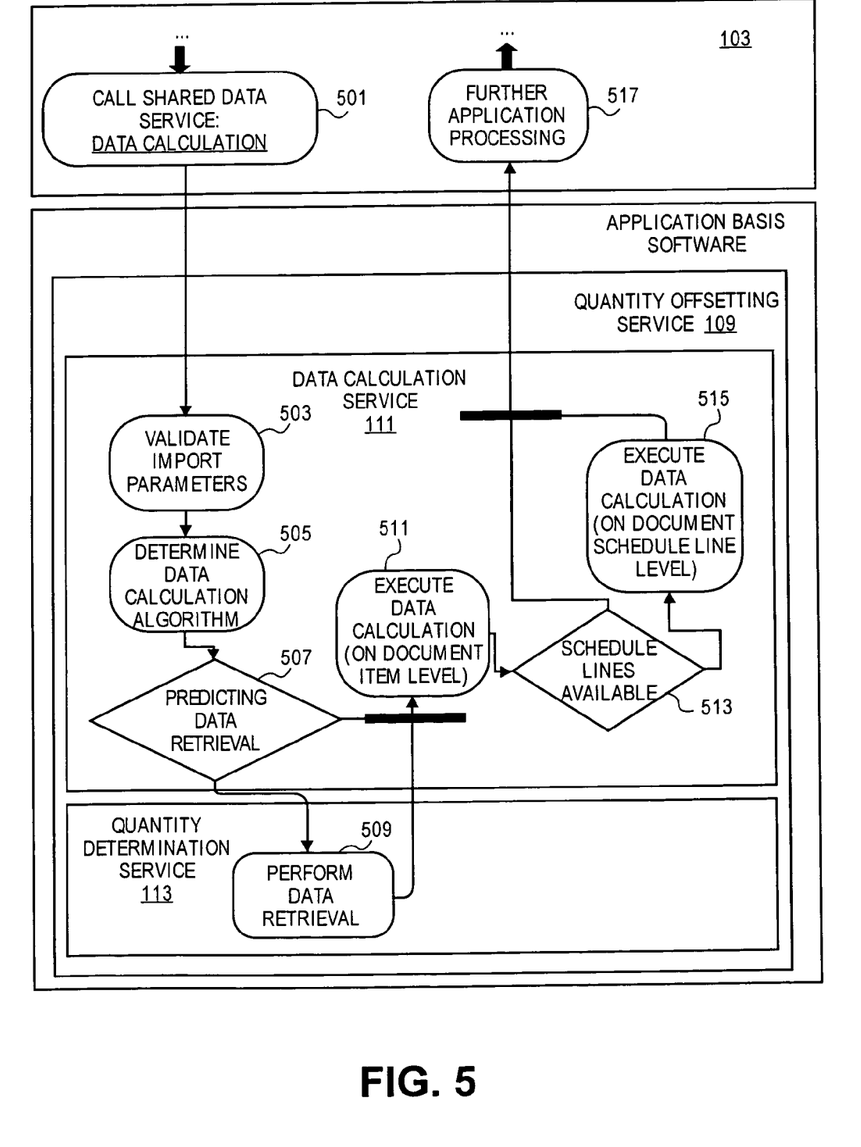
FIG. 5 is a diagram of one embodiment of a shared data calculation service.

FIG. 5 is a diagram of one embodiment of the function of a data calculation service. In one embodiment, application 103 may call the shared data services or specifically the data calculation service 111. For example, the data calculation service may be called when a related document is created or modified requiring the update of a primary document. The application 103 may utilize the data calculation service to calculate a value associated with a particular data source or a subcomponent of a data source such as an item line or schedule line in a document. For example, a data calculation service may be used to determine unfulfilled or 'open' quantities in an SCM application. In one embodiment, the application 103 may send an indication of a requested value, a document or data source location or similar parameters. In one embodiment, the data calculation service may receive a set of parameters that indicate the desired value needed by the application user or administrator. Parameters may include a use case or context indicator, primary document category, desired unit of measurement, requested value, item or schedule line indicator and similar information. In one embodiment, the data calculation service 111 may receive a single request for a value at a time. In another embodiment, the data calculation service 101 may receive multiple requests to be processed simultaneously, in parallel or sequentially. The multiple requests may be provided in the form of a table or similar data structure. For sake of convenience the discussion relates to processing a single requests, but this may be extrapolated to be applied to multiple requests.

In one embodiment, the data calculation service 111 receives the request from the application 103 and validates the received parameters (block 503). The validation of parameters may check that a valid range of parameters have been input or imported and that indicated data sources or documents exist. If the check fails an error message may be returned to the requesting application.

In one embodiment, the incoming parameters may be analyzed to determine an appropriate data calculation algorithm (block 505). In one embodiment, the indicated document type or requested value may be used to determine the appropriate algorithm for calculating a requested value. In one embodiment, the data calculation rule may be defined per a system or customized profile and data source type or category such as a document category. The data calculation rule may define the algorithm to apply and the values to be generated. In one embodiment, the algorithm may be use or context dependent.

The algorithm may have any level of complexity and indicate a set of intermediate values to be generated. The algorithm may be standard with the service or customized by a user. After determining the appropriate algorithm, a check may be made to determine whether or not constituent data needs to be retrieved from a data source (block 507). The application 103 or user may supply all the requisite data making data retrieval unnecessary. The application 103 may also supply an indication of a requested value or an indication of a data source where data for calculating a value may be retrieved. In one embodiment, in a case where the data must be retrieved, a call may be made by the data calculation service 111 to the data retrieval service 113. The data retrieval service 113 may perform a retrieval as discussed in regard to FIG. 3 above where the data calculation service 111 is making the call instead of application 103 (block 509).

In one embodiment, after the retrieval of data by the data retrieval service or if data retrieved is not necessary, the data calculation service 111 may start the execution of a data calculation at the document item line level (block 511). A referenced document may have multiple item, lines in it and the application 103 may indicate a request for a single value corresponding to a single document item line or may indicate multiple values corresponding to multiple items lines. In one embodiment, a document may also have multiple schedule lines. The data calculation service 111 checks when the multiple schedule lines are available (block 515). A schedule line may be an entry in a document relating to an item that has an associated temporal value. For example, a delivery of an item may be scheduled for a particular date or time. If any schedule or item lines are present in a document, then additional calculations may be done at the schedule and document item level to determine a requested value or set of values. A final value then may be returned to the application 103 for further processing (block 517). In one embodiment, the requested data may be returned, related, alone or in combination with other data including item level and schedule level data. In one embodiment, if multiple requests were processed in parallel or simultaneously, then the requested data may be returned at one time. In one embodiment, a set of results may be returned in a table or similar data structure.

Figure 6:
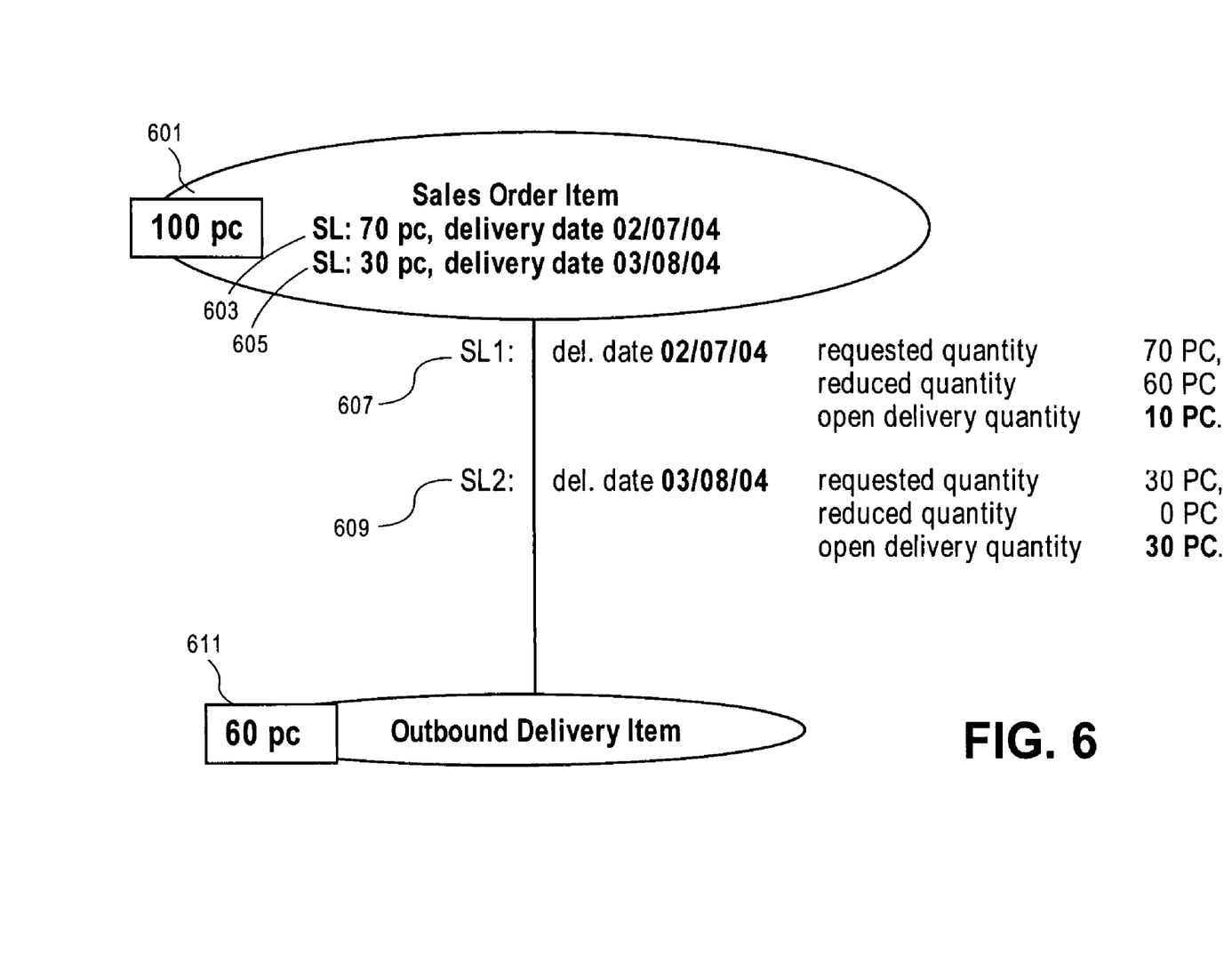
FIG. 6 is a diagram of an example application of the shared data calculation service.

FIG. 6 is a diagram of one example of the use of a data calculation service. In one embodiment, an application may indicate a sales order document 601 and request a value for an outbound delivery document 611. Sales order document 601 represents an order for 100 pieces of an item. The sales order 601 may be subdivided into two separate schedule lines, schedule line 1, 603 and schedule line 2, 605. The first schedule line 603 in the example is an order for 70 pieces with the delivery date of Feb. 7, 2004. The second schedule line is an order for 30 pieces to be delivered on Mar. 8, 2004. Each of these orders may be supplied to the data calculation service by a user, an application, derived from document data or other data source by a call to the data retrieval service or similarly obtained.

In one embodiment, the data calculation service may select an algorithm based on the applicable data calculation rule. In this example, a chronological algorithm may be indicated by the data calculation rule and applied to calculate the outbound delivery amount based on the separate schedule lines. In one embodiment, a chronological algorithm may resolve schedule lines in chronological order. In this example, the first schedule line to be resolved is schedule line 1, 603. The algorithm may apply the maximum quantity to the requested quantity for the schedule line to fulfill the request of the sales order related to the schedule line 607. In this example, only 60 pieces are currently available and the request is for 70 pieces. This leaves an unfulfilled quantity of 10 pieces. The algorithm then attempts to fulfill subsequent schedule lines. The algorithm may subsequently sum the fulfilled quantity of each schedule line to determine the overall fulfilled quantity for the outbound delivery. In this example, the requested quantity for the second schedule line is 30 pieces. However, no pieces are available. Thus, an unfulfilled quantity of 30 pieces is the result. The two schedule lines for fulfilled orders totals 60 which may then be returned to the requesting application to be tied to the outbound delivery document 611.

The shared data services may be implemented in software, for example, in a simulator, emulator or similar software. A software implementation may include a microcode implementation. A "machine readable" medium may include any medium that can store information. Examples of a machine readable medium include a ROM, a floppy diskette, a CD-ROM, an optical disk, and a hard disk. In one embodiment, the software implementation may be in an object oriented paradigm or similar programming paradigm. The parts of the system may be structured and coded as a set of interrelated objects.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A method comprising:
    receiving by using a computer an indication of a data source from a separate application by a program in a shared software layer;
    selecting a value determination rule based on characteristics of the data source, at least in part, by determining the value determination rule associated with a document type;
    analyzing based on the value determination rule the data source to determine a set of related data sources;
    generating a value from data retrieved from the data source and the set of related data sources, wherein the generating the value comprises: applying a unit conversion to data retrieved from one of the data source and set of related data sources;
    returning the value;
    receiving a plurality of indications of a set of data sources from a set of separate applications; and
    generating a set of values simultaneously based on the set of data sources.

2. The method of claim 1, wherein the data source is a document flow.

3. The method of claim 1, wherein the data source is a set of databases.

4. The method of claim 1, wherein the analyzing the data source comprises:
    determining a relation to a second document; and
    accessing the second document to determine a relation to a third document.

5. The method of claim 1, wherein generating a value comprises:
    applying an algorithm selected by the rule to the data source and the set of related data sources.

6. The method of claim 1, wherein the program is a shared service.

* * * * *